United States Patent
Shin et al.

(10) Patent No.: US 8,300,676 B2
(45) Date of Patent: Oct. 30, 2012

(54) APPARATUS AND METHOD FOR COMMUNICATION

(75) Inventors: Cheol-Ho Shin, Daejeon (KR); Byoung Hak Kim, Daejeon (KR); Jong Won Kim, Daejeon (KR); Sangsung Choi, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 623 days.

(21) Appl. No.: 12/536,929

(22) Filed: Aug. 6, 2009

(65) Prior Publication Data

US 2010/0124252 A1 May 20, 2010

(30) Foreign Application Priority Data

Nov. 18, 2008 (KR) .................. 10-2008-0114699
Dec. 23, 2008 (KR) .................. 10-2008-0131841

(51) Int. Cl.
*H04B 1/00* (2006.01)

(52) U.S. Cl. ........................................ 375/144

(58) Field of Classification Search .......... 375/130, 375/140, 144, 146, 147, 148, 295, 296, 316, 375/346; 455/91, 114.2, 114.3; 370/208, 370/210, 203
See application file for complete search history.

(56) References Cited

U.S. PATENT DOCUMENTS

| | | | |
|---|---|---|---|
| 6,426,983 B1 * | 7/2002 | Rakib et al. ............... | 375/346 |
| 2005/0047444 A1 | 3/2005 | Park et al. | |
| 2007/0147236 A1 | 6/2007 | Lee | |
| 2007/0223608 A1 * | 9/2007 | Nakayama et al. ....... | 375/260 |
| 2007/0291636 A1 * | 12/2007 | Rajagopal et al. ........ | 370/208 |
| 2008/0045175 A1 | 2/2008 | Yoon et al. | |
| 2008/0069181 A1 | 3/2008 | Lee et al. | |

FOREIGN PATENT DOCUMENTS

| | | |
|---|---|---|
| KR | 10-2005-0008462 A | 1/2005 |
| KR | 10-0766041 B | 10/2007 |
| KR | 10-0766041 B1 | 10/2007 |
| KR | 10-2008-0016337 A | 2/2008 |

OTHER PUBLICATIONS

Cheol-Ho Shin, ByoungHak Kim, and Sangsung Choi, "A study of Detection algorithm for DAA regulation of Korea using MB-OFDM UWB Receiver", ISOCC 2008, Nov. 24, 2008.

* cited by examiner

Primary Examiner — David C. Payne
Assistant Examiner — Vineeta Panwalkar
(74) Attorney, Agent, or Firm — Kile Park Goekjian Reed & McManus PLLC

(57) ABSTRACT

A communication apparatus generates a digital detection signal including a plurality of time symbols by digital-converting a detection signal corresponding to a received signal, estimates an average power value of the detection signal by calculating average power of the digital detection signal based on the digital detection signal, and performs UWB communication through a predetermined first channel when a predetermined reference power value is greater than the average power value.

14 Claims, 12 Drawing Sheets

FIG. 10

−80dBm/MHz ——————— Detection level of interfered signal ————————⏉
                                                                                                                    │ 28dBm/MHz
−108dBm/MHz ——————— Minimum receiving sensitivity of communication apparatus 100 ——⏊

−114dBm/MHz ————————————— AWGN ———————————

FIG. 11

| Ratio of interfered signal detection level to receiving level of actually received interfered signal (dB) | Interfered signal detection probability | | | | | |
|---|---|---|---|---|---|---|
| | N | | | | | |
| | 1 | 2 | 4 | 8 | 12 | 18 |
| -0.5 | 0.3090 | 0.1710 | 0.0430 | 0.0070 | 0 | 0 |
| 0 | 0.5640 | 0.6290 | 0.6750 | 0.7880 | 0.8850 | 0.9250 |
| +0.5 | 0.7570 | 0.9130 | 0.9680 | 0.9990 | 1 | 1 |

(a)

| n | Interfered signal detection probability | | | | | |
|---|---|---|---|---|---|---|
| | Detection range | | | | | |
| | [f1b or lf2b] | [f19,f2b] | [f18,f19,f2b] | [f18,f19,f20 f21] | [f17,f18,f19 f20 f21] | [f17,f18,f19 f20 f21 f22] |
| 8 | 0.3980 | 0.9690 | 0.9690 | 0.9690 | 0.9690 | 0.9690 |
| 16 | 0.0900 | 0.9620 | 1 | 1 | 1 | 1 |
| 32 | 0.0070 | 0.4670 | 0.8550 | 0.9990 | 1 | 1 |
| 64 | 0 | 0.0720 | 0.2780 | 0.6720 | 0.7730 | 0.8780 |

(b)

APPARATUS AND METHOD FOR COMMUNICATION

CROSS-REFERENCE TO RELATED APPLICATION

This application claims priority to and the benefit of Korean Patent Application Nos. 10-2008-0114699 and 10-2008-0131841 filed in the Korean Intellectual Property Office on Nov. 18, 2008 and Dec. 23, 2008, the entire contents of which are incorporated herein by reference.

BACKGROUND OF THE INVENTION (a) Field of the Invention

The present invention relates to a communication method and an apparatus using the same. Particularly, it relates to a communication apparatus for ultra-wideband communication, and a method thereof.

(b) Description of the Related Art

An ultra-wideband (UWB) communication method is a near field communication (NFC) technique that realizes high-speed communication with low power through a frequency band that is wider than the existing spectrum, and has merits of high-speed transmission in a local area and improving energy use efficiency without a power amplifier since it can reduce output power. In addition, the UWB communication method can be utilized in a location-based low power Ad-Hoc network since it can correspond to multipath fading and calculate a device-to-device distance with a precision of several centimeters from a pulse arrival time.

However, since the UWB communication method uses a broad frequency bandwidth, it causes interference with a communication device that employs a communication method other than the UWB communication method.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a communication apparatus for performing UWB communication without causing interference with a communication apparatus using another communication method, and a method thereof.

A communication method according to an exemplary embodiment of the present invention includes generating a digital detection signal that includes a plurality of time symbols by digital-converting a detecting signal corresponding to a received signal, estimating an average power value of the detection signal by calculating average power of the digital detection signal based on the digital detection signal, and when a predetermined reference power value is greater than the average power value, performing UWB communication through a predetermined first channel.

In this case, the first channel includes a plurality of subcarriers, and the communication method further includes, when the average power value is greater than the reference power value, generating location information that corresponds to information for a subcarrier where an interfered signal exists by detecting a location of the interfered signal based on the digital detection signal, and performing UWB communication through a part of the plurality of subcarriers included in the first channel, excluding a subcarrier corresponding to the information.

The generating of the location information includes Fourier-transforming N time symbols among a plurality of time symbols included in the digital detection signal to generate N frequency symbols respectively corresponding to the N time symbols, generating a plurality of sample sums respectively corresponding to a plurality of subcarriers according to a predetermined detection bandwidth based on the N frequency symbols, performing an operation for adding an absolute value of a real number and an absolute value of an imaginary number of each sample sum based on the plurality of sample sums to generate a plurality of sample absolute values respectively corresponding to the plurality of sample sums, generating a reference value for determining existence of the interfered signal based on the plurality of sample absolute values, and generating first location information corresponding to information on a subcarrier where the interfered signal exists among the plurality of subcarriers according to the detection bandwidth by comparing each of the plurality of sample absolute values with the reference value.

In addition, each of the N frequency symbols includes a plurality of frequency samples, and the generating of the plurality of sample sums includes generating a plurality of sample sums respectively corresponding to the plurality of subcarriers according to the detection bandwidth by performing an operation for adding a frequency sample corresponding to each of the plurality of subcarriers according to the detection bandwidth.

The generating of the reference value includes performing an operation for dividing a total of the plurality of sample absolute values by a predetermined subcarrier detection range value to generate the reference value.

The generating of the first location information includes comparing each of the plurality of sample absolute values respectively corresponding to the plurality of subcarriers according to the detection bandwidth with the reference value and determining whether the interfered signal exists in a subcarrier that corresponds to a sample absolute value that is greater than the reference value to generate the first location information.

The communication method further includes, before the generating of the digital detection signal, generating the detection signal by detecting a signal component corresponding to the first channel from the received signal.

In addition, the communication method further includes, when the average power value is greater than the reference power value, changing the first channel to a second channel, and the generating of the detection signal includes detecting a signal component corresponding to the second channel from the received signal to generate the detection signal.

The generating of the detection signal includes detecting a signal component corresponding to the first channel from the received signal for a predetermined time period, and generating the detection signal by amplifying the signal component with a predetermined gain.

A communication apparatus according to another exemplary embodiment of the present invention performs UWB communication, and includes a module, a converter, a controller, and a communication unit. The module detects a signal component corresponding to a first channel for UWB communication from a signal received for a predetermined time period, and outputs a detection signal by amplifying the detected signal component. The converter digital-converts the detection signal and outputs a digital detection signal. The controller estimates an average power value of the detection signal based on the digital detection signal, determines existence of an interfered signal from the first channel through the average power value, and applies a detection and avoid (DAA) method according to the determination result The communication unit performs UWB communication according to control of the controller.

The controller changes the first channel to a second channel when the interfered signal is detected from the first channel.

In addition, the digital detection signal includes a plurality of time symbols, and the controller includes a data arranging unit outputting a part of the plurality of time symbols in parallel, and a power calculation unit calculating average power of the partial time symbols based on the partial time symbols and outputting the average power value.

The controller generates information on a subcarrier where the interfered signal exists in a frequency domain when the interfered signal is detected from the first channel, and the communication unit performs UWB communication through the first channel by using a tone-nulling method corresponding to the information.

In addition, the controller includes a data arranging unit outputting a part of the plurality of time symbols in parallel, and a location tracking unit generating the information based on a plurality of frequency symbols that respectively correspond to the partial time symbols.

Each of the plurality of frequency symbols includes a plurality of frequency samples that respectively correspond to a plurality of subcarriers, and the location tracking unit includes a plurality of Fourier transform units that respectively correspond to the partial time symbols and outputs the plurality of frequency symbols by Fourier-transforming the partial time symbols, a first operation unit outputting a plurality of sample sums respectively corresponding to the plurality of subcarriers by adding a frequency sample that corresponds to each of the plurality of subcarriers based on the plurality of frequency symbols, a second operation unit outputting a plurality of sample absolute values respectively corresponding to the plurality of sample sums by adding an absolute value of a real number and an absolute value of an imaginary value of is each sample sum based on the plurality of sample sums, a third operation unit outputting a reference value by dividing a total of the plurality of sample absolute values with a predetermined subcarrier detection range value based on the plurality of sample absolute values, and a location detection unit generating the information by comparing each of the plurality of sample absolute values with the reference value.

BRIEF DESCRIPTION OF THE DRAWINGS

FIG. 10 shows a received power strength difference between a detection level of an interfered signal and a minimum receiving sensitivity of the communication apparatus according to the exemplary embodiment of the present invention.

FIG. 11 shows an interfered signal detection probability according to the number of time symbols selected by a data arranging unit according to the exemplary embodiment of the present invention.

DETAILED DESCRIPTION OF THE EMBODIMENTS

Figure 1:
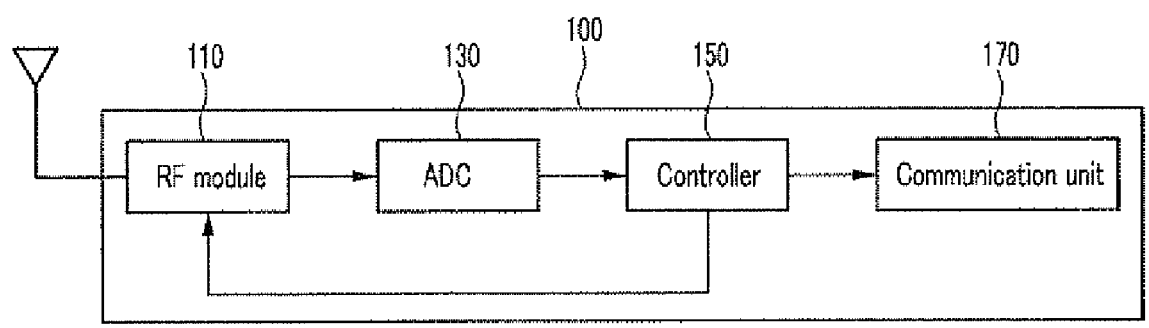
FIG. 1 shows a configuration of a communication apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

A communication apparatus for ultra-bandwidth communication according to an exemplary embodiment of the present invention, and a method thereof, will be described with reference to the drawings.

A configuration of a communication apparatus according to an exemplary embodiment of the present invention will now be described with reference to FIG. 1.

FIG. 1 shows the configuration of the communication apparatus according to the exemplary embodiment of the present invention.

As shown in FIG. 1, as an ultra-wideband (UWB) communication device, a communication apparatus 100 according to the exemplary embodiment of the present invention performs UWB communication by applying a detection and avoid (DAA) method. In this case, the communication apparatus 100 can perform the UWB communication according to a multi-band orthogonal frequency division multiplexing (MB-OFDM) method.

To do this, the communication apparatus according to the exemplary embodiment of the present invention includes a radio frequency (RF) module 110, an analog-to-digital converter (ADC) 130, a controller 150, and a communication unit 170.

The RF module 110 detects a signal component that corresponds to a predetermined first UWB channel among a plurality of UWB channels from signals received through an antenna for a predetermined time period, amplifies the detected signal component with a predetermined gain, and outputs the amplified signal component (hereinafter referred to as a detected signal). In this case, the first UWB channel is a predetermined channel for the communication unit 170 to perform the UWB communication. In addition, the RH module 110 can amplify a detected signal component by a predetermined gain to amplify the detected signal component to a predetermined appropriate input level of the ADC 130, and accordingly, the RF module 110 may include a variable gain amplifier.

The ADC 130 converts an analog detected signal to a digital signal and outputs a digital-converted detected signal (hereinafter referred to as a digital detected signal). In this case, the digital detected signal includes a plurality of time symbols, and each of the plurality of time symbols includes a plurality of time samples.

The controller 150 determines whether an interfered signal exists in the first UWB channel based on the digital detected signal, and controls the RF module 110 or the communication unit 170 according to the determination result. In this case, the controller 150 changes the first UWB channel to a second UWB channel, and may control the RF module 110 to output a detected signal corresponding to the second UWB channel. Alternatively, the controller 150 may control the communication unit 170 to perform UWB communication through the first UWB channel by applying the DAA method. In this case, the controller 150 may set a gain of the variable gain amplifier included in the RF module 110 according to a bandwidth (hereinafter also referred to as a detection bandwidth) for detecting a predetermined interfered signal.

The communication unit 170 performs UWB communication according to control of the controller 150.

A detection bandwidth for detection of an interfered signal according to the exemplary embodiment of the present invention will be described with reference to FIG. 2.

Figure 2:
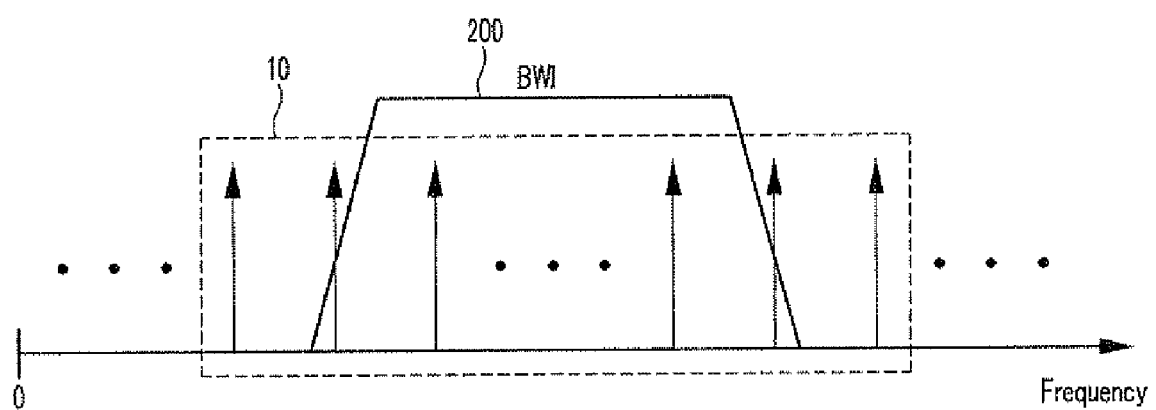
FIG. 2 shows a detection bandwidth according to the exemplary embodiment of the present invention.

FIG. 2 shows a detection bandwidth according to the exemplary embodiment of the present invention.

As shown in FIG. 2, a detection bandwidth (hereinafter also referred to as a BWI) 200 partially includes a plurality of subcarriers 10 of a frequency bandwidth.

Figure 3:
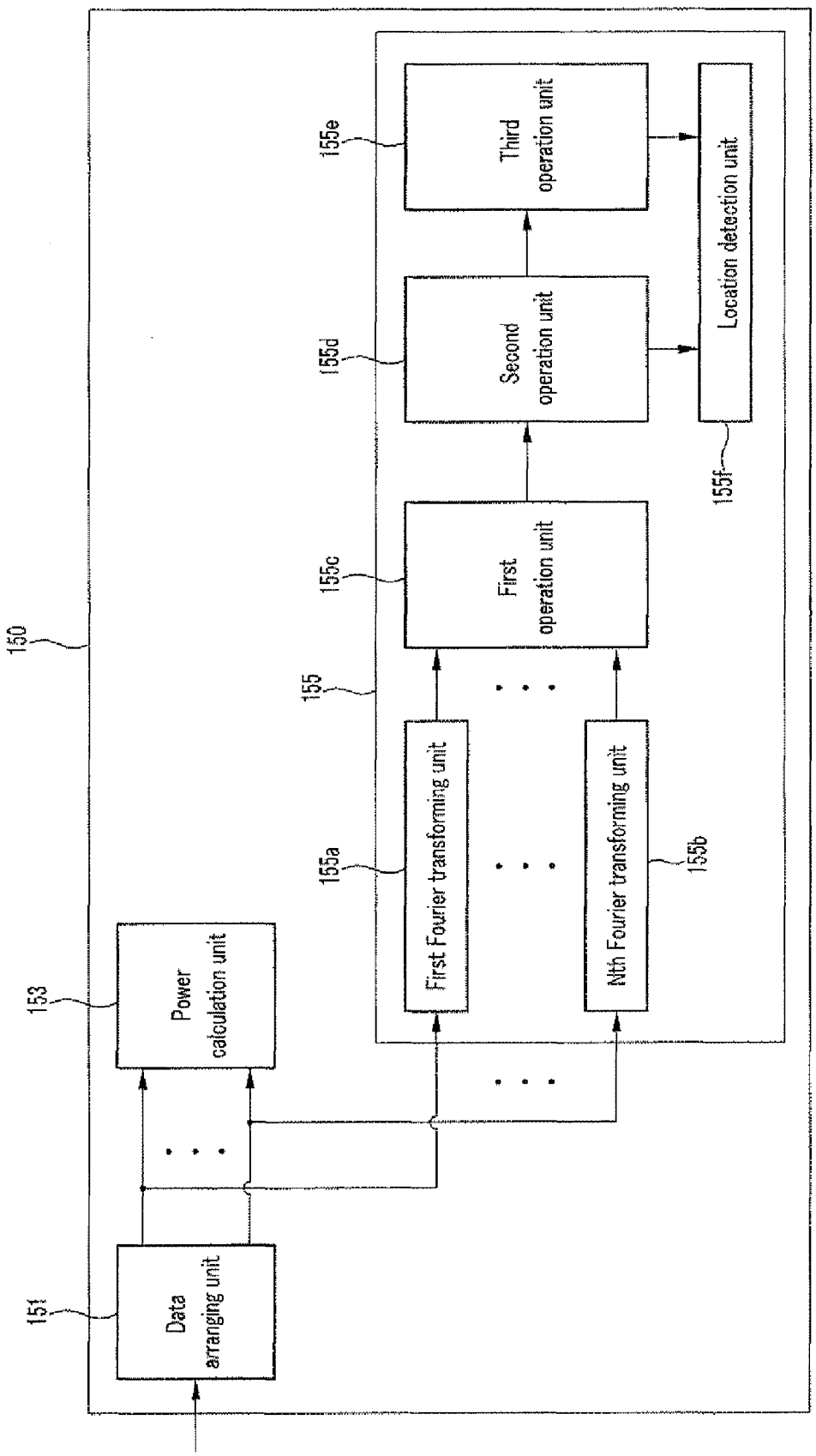
FIG. 3 shows a configuration of a controller according to the exemplary embodiment of the present invention.

Referring to FIG. 3, the controller of the communication apparatus according to the exemplary embodiment of the present invention will be described.

FIG. 3 shows a configuration of the controller according to the exemplary embodiment of the present invention.

As shown in FIG. 3, the controller 150 according to the exemplary embodiment of the present invention includes a data arranging unit 151, a power calculation unit 153, and a location tracking unit 155.

The data arranging unit 151 selects a part of time symbols corresponding to a predetermined number of time symbols among the plurality of time symbols included in the digital detected signal, and outputs the plurality of selected time symbols in parallel.

The power calculation unit 153 calculates average power of the plurality of selected time symbols based on the plurality of selected time symbols.

The location tracking unit 155 tracks a location of a subcarrier where the interfered signal exists among the plurality of subcarriers 10 based on the plurality of selected time symbols, and includes a plurality of Fourier transform units 155a and 155b, a first operation unit 155c, a second operation unit 155d, a third operation unit 155e, and a location detection unit 155f.

The plurality of Fourier transform units 155a and 155b respectively correspond to the plurality of selected time symbols, and output a plurality of frequency symbols that respectively correspond to the plurality of selected time symbols by performing Fourier transform on each of the plurality of selected time symbols. In this case, each of the plurality of frequency symbols includes a plurality of frequency samples that respectively correspond to the plurality of subcarriers 10.

The first operation unit 155c adds the plurality of frequency samples that respectively correspond to each subcarrier based on each of the plurality of frequency symbols, and outputs a plurality of sample sums. In this case, each of the plurality of sample sums corresponds to a complex number value.

The second operation unit 155d adds an absolute value of a real number and an absolute value of an imaginary number of each sample sum based on the plurality of sample sums, and outputs a plurality of sample absolute values that respectively correspond to the plurality of sample sums.

The third operation unit 155e divides the sum of the plurality of sample absolute values with a value that corresponds to a subcarrier detection range to output a reference value for determining whether an interfered signal exists in to each of the plurality of subcarriers 10.

The location detection unit 155f compares each of the plurality of sample absolute values with the reference value to detect a subcarrier where the interfered signal exists.

Next, referring to FIG. 4 to FIG. 7, a UWB communication method of the communication apparatus according to an exemplary embodiment of the present invention will be described.

Figure 4:
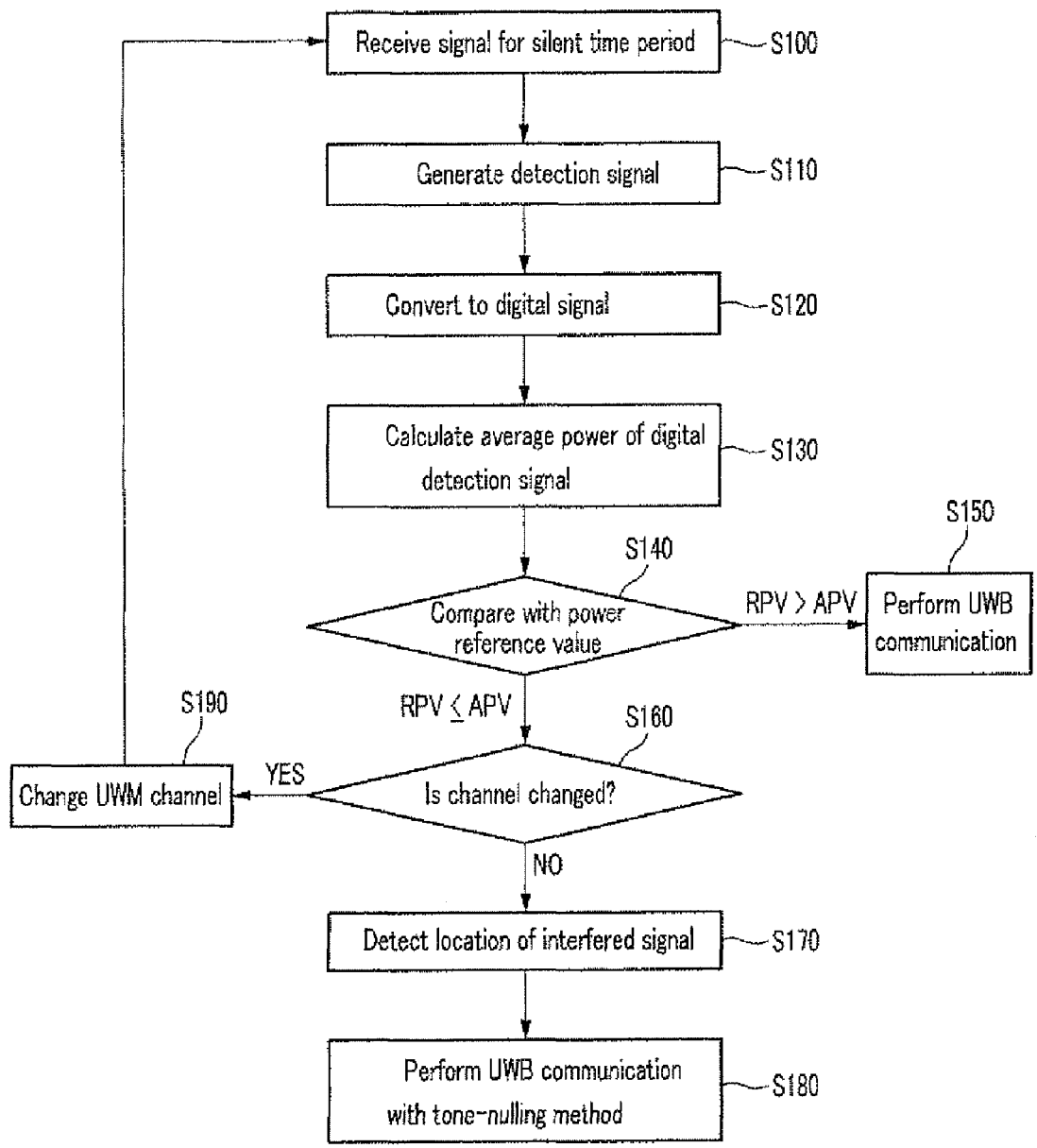
FIG. 4 shows a communication method according to an exemplary embodiment of the present invention.

FIG. 4 shows a communication method according to an exemplary embodiment of the present invention.

As shown in FIG. 4, the communication apparatus 100 receives a signal through an antenna for a predetermined silent time (S100).

The RF module 110 detects a signal component that corresponds to the predetermined first UWB channel from the received signal to generate a detection signal (S110).

Hereinafter, referring to FIG. 5, a method for generating a detection signal according to the exemplary embodiment of the present invention will be described.

Figure 5:
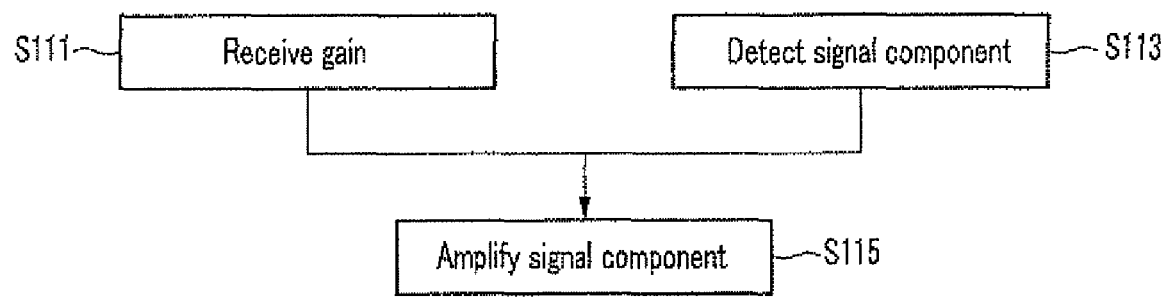
FIG. 5 shows a detection signal generation method according to the exemplary embodiment of the present invention.

FIG. 5 shows a detection signal generation method according to the exemplary embodiment of the present invention.

As shown in FIG. 5, the RF module 110 receives a gain of the variable gain amplifier from the controller 150 (S111). In this case, the controller 150 may set a gain of the variable gain amplifier based on a gain of the variable gain amplifier, which is required for amplifying the minimum receiving sensitivity of the communication apparatus 100 to the appropriate input level of the ADC 130, a received power strength difference between a detection level of the interfered signal and the minimum receiving sensitivity of the communication apparatus 100, and a received signal bandwidth and a detection bandwidth of the communication apparatus 100. In addition, the gain of the variable gain amplifier can be calculated as given in Equation 1.

$$G = G_a - G_b + 10 * \log(BW_r/BWI) \quad \text{[Equation 1]}$$

In Equation 1, G denotes a gain of the variable gain amplifier, $G_a$ denotes a gain of the variable gain amplifier that is required for amplifying the minimum receiving sensitivity of the communication apparatus 100 to the appropriate input level of the ADC 130, and $G_b$ denotes a received power strength difference between a detection level of the interfered signal and the minimum receiving sensitivity of the communication apparatus 100. In addition, $BW_r$ denotes a received signal bandwidth of the communication apparatus 100, and BWI denotes a detection bandwidth.

Next, the RF module 110 detects a signal component corresponding to the predetermined first UWB channel from the received signal (S113).

The RF module 110 generates a detection signal by amplifying the detected signal component by the received gain (S115).

Referring back to FIG. 4, the method for the communication apparatus to perform the UWB communication according to the exemplary embodiment of the present invention will be described.

The ADC 130 generates a digital detection signal including a plurality of time symbols by converting the detection signal into a digital signal (S120). In this case, each of the plurality of time symbols includes a plurality of time samples.

The controller 150 estimates an average power value of the detection signal by calculating an average power of digital detection signal based on the digital detection signal (S130).

Hereinafter, referring to FIG. 6, a method for the controller to generate a power estimate value of a detection signal according to the exemplary embodiment of the present invention will be described.

Figure 6:
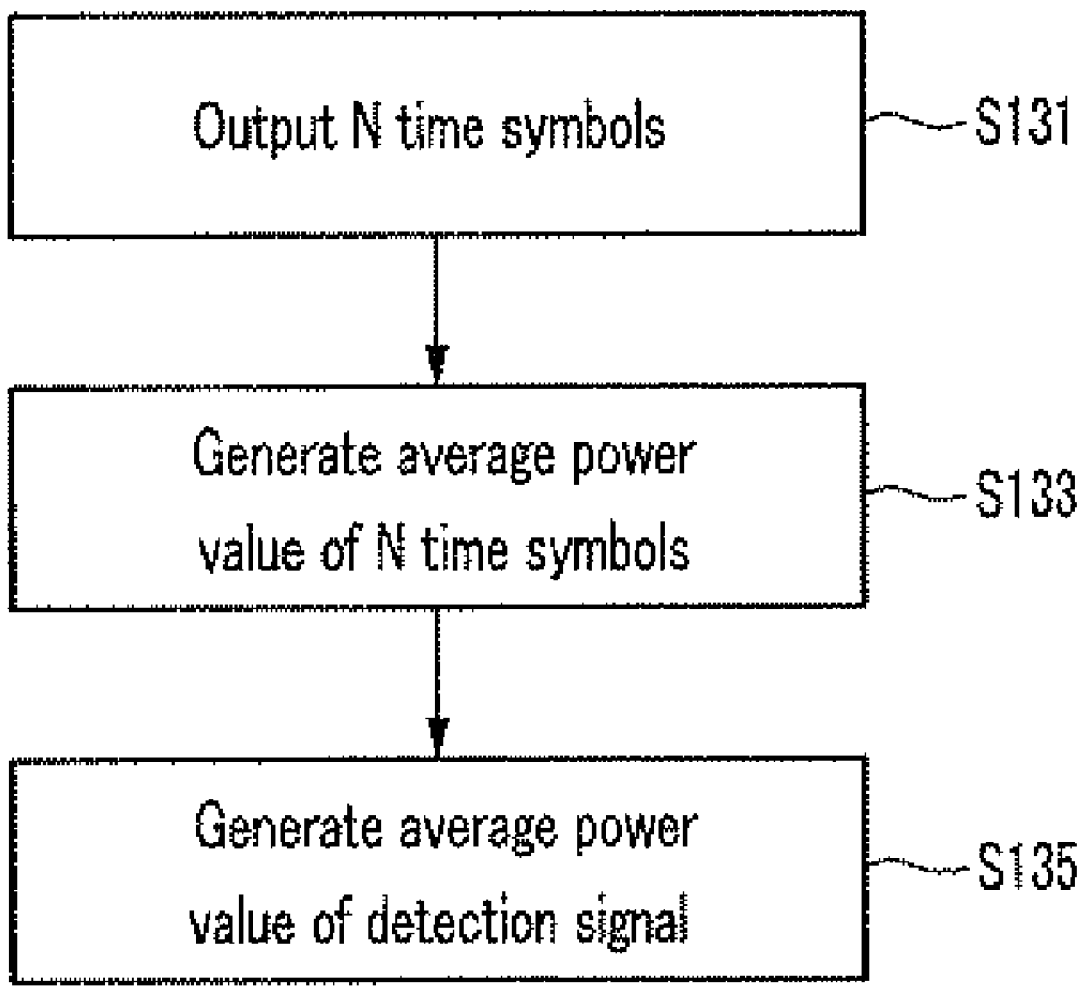
FIG. 6 shows a power estimated value generation method according to the exemplary embodiment of the present invention.

FIG. 6 shows a power estimate value generating method according to the exemplary embodiment of the present invention.

As shown in FIG. 6, the data arranging unit 151 outputs N time symbols in parallel among a plurality of time symbols included in the digital detection signal (S131). In this case, each of the N time symbols may include 128 time samples.

The power calculation unit 153 calculates an average power for the N time symbols based on the N time symbols to generate an average power value of the N time symbols (S133) In this case, the power calculation unit 153 may calculate the average power for the N time symbols according to Equation 2.

$$P_{rx} = \frac{1}{N}\sum_{l=1}^{N}\left(\frac{1}{128}\sum_{k=0}^{127}(\text{Re}(y_{l,k})^2 + \text{Im}(y_{l,k})^2)\right)$$ [Equation 2]

In Equation 2, $P_{rx}$ denotes an average power of the N time symbols and $y_{l,k}$ denotes a plurality of time samples included in one of the N time symbols. In this case, l denotes an index of each of the N time symbols, and k denotes an index of each of the plurality of time samples included in each of the time symbols.

The controller 150 estimates the average power value of the N time symbols as an average power value of the detection signal (S135).

Referring back to FIG. 4, the UWB communication method of the communication apparatus according to the exemplary embodiment of the present invention will be described.

The controller 150 compares the predetermined reference power value (RPV) with the estimated average power value (APV) of the detection signal (S140).

If the reference power value (RPV) is greater than the estimated average power value (APV), the communication unit 170 performs UWB communication through the first UWB channel according to control of the controller 150 (S150). In this case, the controller 150 determines that no interfered signal exists in the first UWB channel and controls the communication unit 170 to perform the UWB communication through the first UWB.

If the estimated average power value (APV) is greater than the reference power value (RPV), the controller 150 determines whether to change the first UWB channel set for the UWB communication to another channel (S160). In this case, the controller 150 determines existence of the interfered signal in the first UWB channel, and determines whether to perform a channel change avoid operation.

If the channel is not changed, the controller 150 generates information (hereinafter referred to as location information) on a subcarrier where the interfered signal exists by detecting a location of the interfered signal based on the digital detection signal (S170).

Hereinafter, a method for detecting a location of an interfered signal according to the exemplary embodiment of the present invention will be described with reference to FIG. 7.

Figure 7:
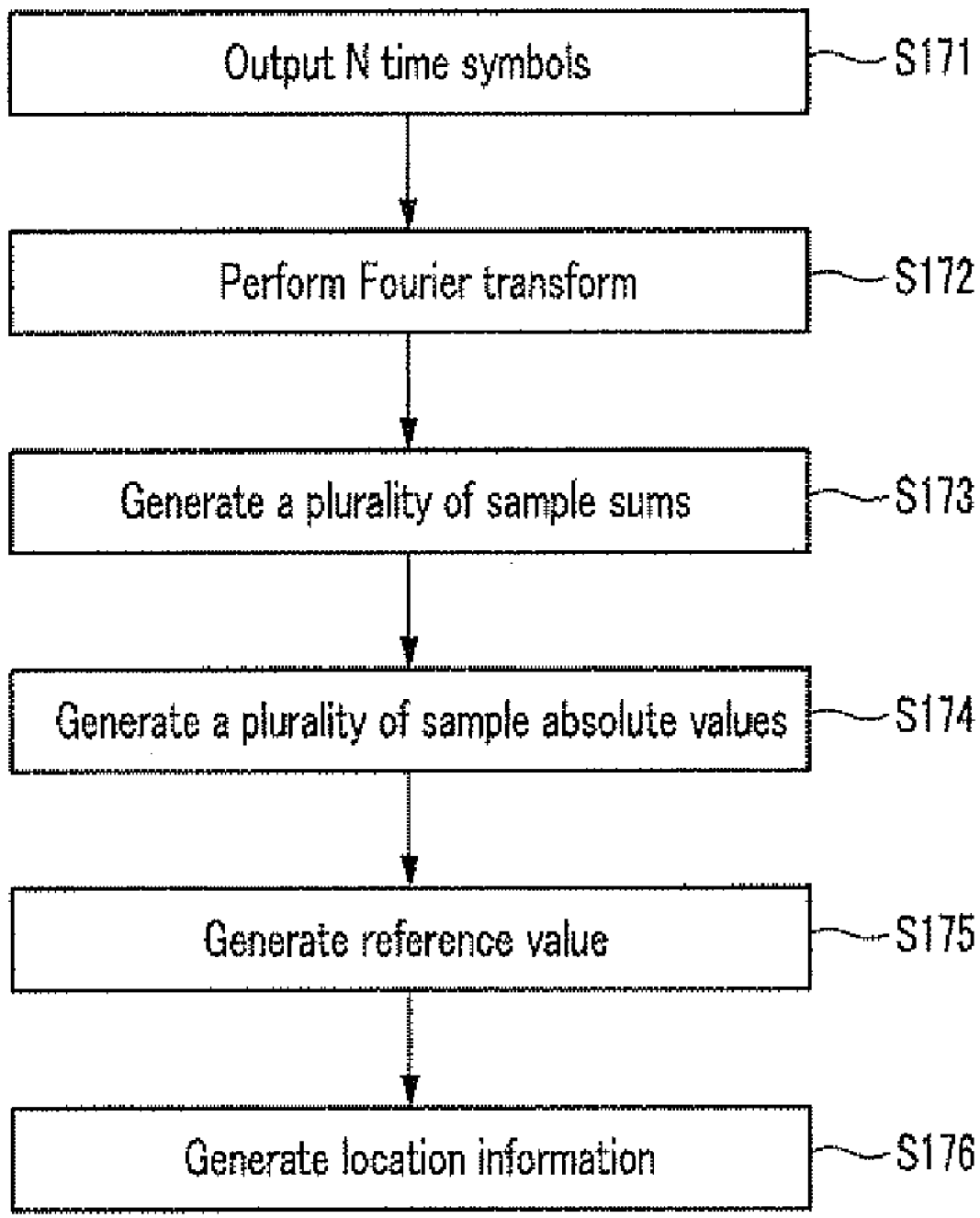
FIG. 7 shows a location detection method of an interfered signal according to the exemplary embodiment of the present invention.

FIG. 7 shows a location detection method of an interfered signal according to the exemplary embodiment of the present invention.

As shown in FIG. 7, the data arranging unit 151 outputs N time symbols in parallel among a plurality of time symbols included in the digital detection signal (S171). In this case, each of the N time symbols may include 128 time samples.

Next, the plurality of Fourier transform units 155a and 155b generate N frequency symbols respectively corresponding to the N time symbols by Fourier transforming the N time symbols (S172). In this case, each of the N frequency symbols includes a plurality of frequency samples respectively corresponding to the plurality of subcarriers. In addition, each frequency symbol may include 128 frequency samples that respective correspond to 128 subcarriers.

The first operation unit 155c adds a plurality of frequency samples respectively corresponding to each subcarrier based on the N frequency symbols to generate a plurality of sample sums respectively corresponding to the plurality of subcarriers (S173). In this case, each of the plurality of sample sums corresponds to a complex number value. In addition, the first operation unit 155c may generate 128 sample sums according to Equation 3.

$$Y_k = \sum_{l=1}^{N} Y_{l,k}$$ [Equation 3]

$$k = 0, 1, \ldots, 127$$

In Equation 3, $Y_k$ denotes each of the plurality of sample sums and $Y_{l,k}$ denotes each of the plurality of frequency samples included in each frequency symbol.

Next, the second operation unit 155d adds an absolute value of a real number and an absolute value of an imaginary number of each sample sum based on the plurality of sample sums to generate a plurality of sample absolute values that respectively correspond to the plurality of sample sums (S174). In this case, the second operation unit 155d may generate 128 sample absolute values according to Equation 3 and Equation 4.

$$Z_k = |Re(Y_k)| + |Im(Y_k)| \; k=0, 1, \ldots, 127$$ [Equation 4]

In Equation 4, $Z_k$ denotes each of the plurality of sample absolute values.

The third operation unit 155e divides a total of the plurality of sample absolute values by the subcarrier detection range value based on the plurality of sample absolute values to generate a reference value for determining existence of an interfered signal for each of the plurality of subcarriers (S175). In this case, the third operation unit 155e may gener ate the reference value according to Equation 4 and Equation 5.

$$Z_{ref} = \left(\sum_{k=0}^{127} Z_k\right)/n \qquad \text{[Equation 5]}$$

In Equation 5, $Z_{ref}$ denotes the reference value and n denotes the subcarrier detection range value.

The location detection unit 155*f* compares each of the plurality of sample absolute values with the reference value to generate information (hereinafter is referred to as first location information) for a subcarrier having an interfered signal among a plurality of subcarriers according to a detection bandwidth (S176). In this case, the location detection unit 155*f* may determine that an interfered signal exists in a subcarrier corresponding to a sample absolute value that is greater than the reference value.

Referring back to FIG. 4, the UWB communication method of the communication apparatus according to the exemplary embodiment of the present invention will be described.

The communication unit 170 performs UWB communication through the first UWB channel by using a tone-nulling method corresponding to location information according to control of the controller 150 (S180). In this case, the controller 150 controls the communication unit 170 to perform the UWB communication through a part of a plurality of subcarriers included in the first UWB channel, excluding a subcarrier where an interfered signal exists, based on the location information.

Figure 8:
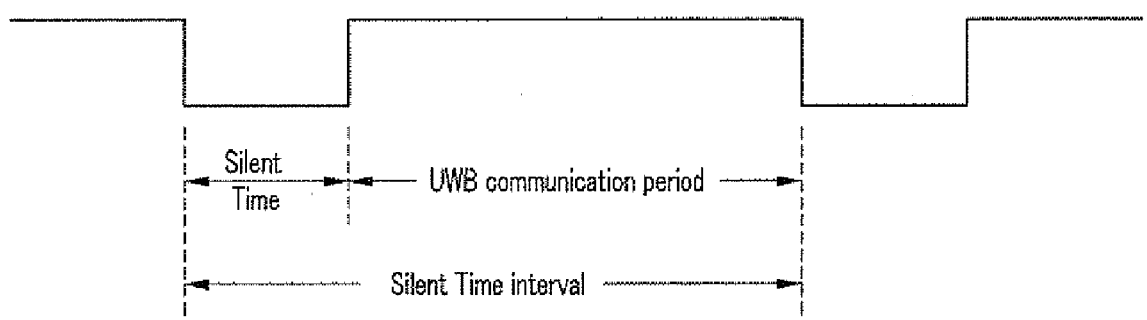
FIG. 8 shows a silent time according to the exemplary embodiment of the present invention.

Referring to FIG. 8, a silent time according to the exemplary embodiment of the present invention will be described.

FIG. 8 shows a silent time according to the exemplary embodiment of the present invention.

As shown in FIG. 8, the communication apparatus 100 detects an interfered signal during a silent time that is repeated for every predetermined silent time period and performs UWB communication at a UWB communication period according to the detection result.

Figure 9:
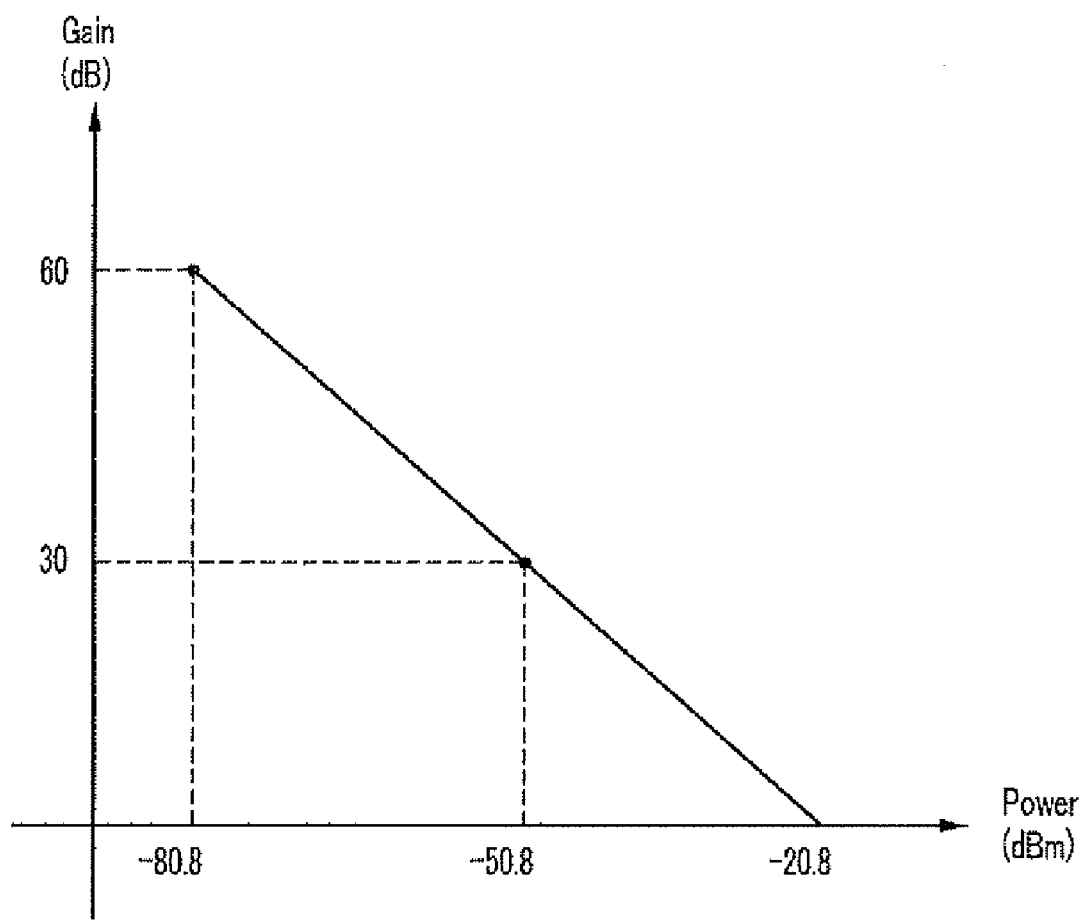
FIG. 9 shows a gain of a variable gain amplifier according to receiving is sensitivity of a radio frequency (RF) according to the exemplary embodiment of the present invention.

Referring to FIG. 9, a gain of a variable gain amplifier according to receiving sensitivity of the RF module according to the exemplary embodiment of the present invention will be described.

FIG. 9 shows a gain of a variable gain amplifier according to receiving sensitivity of the RF module according to the exemplary embodiment of the present invention.

As shown in FIG. 9, when the receiving sensitivity of a signal component detected by the RF module 110 is −80.8 dBm, the RF module 110 may amplify the detected signal component with a gain of 60 dB for amplifying the detected signal component to the appropriate input level of the ADC 130.

In addition, when receiving sensitivity of a signal component detected by the RF module 110 is −50.8 dBm, the RF module 110 may amplify the detected signal component with a gain of 30 dB for amplifying the detected signal component to the appropriate input level of the ADC 130.

Referring to FIG. 10, a received power density difference between a detection level of an interfered signal and the minimum receiving sensitivity of the communication apparatus according to the exemplary embodiment of the present invention will be described.

FIG. 10 shows a received power density difference between a detection level of an interfered signal and the minimum receiving sensitivity of the communication apparatus according to the exemplary embodiment of the present invention.

As shown in FIG. 10, when an interfered signal detection level is −80 dBm/MHz and the minimum receiving sensitivity of the communication apparatus 100 is −108 dBm/MHz, a received power density difference between the interfered signal detection level and the minimum receiving sensitivity of the communication apparatus 100 is 28 dBm/MHz.

Referring to FIG. 11, an interfered signal detection probability according to the number of time symbols selected by the data arranging unit according to the exemplary embodiment of the present invention will be described.

FIG. 11 shows an interfered signal detection probability according to the number of time symbols selected by the data arranging unit according to the exemplary embodiment of the present invention.

The interfered signal detection probability may be shown as the table of FIG. 11 according to a ratio of the number of time symbols (hereinafter referred to as N time symbols) selected by the data arranging unit 151 and the interfered signal detection level.

Figure 12:
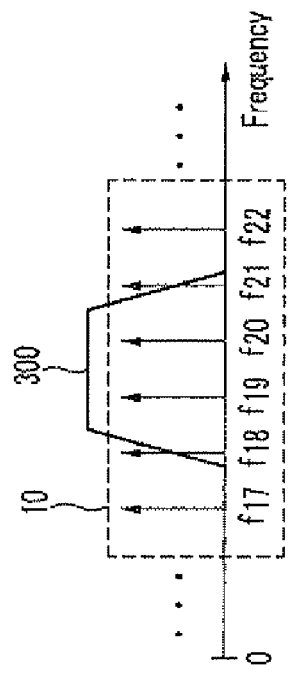
FIG. 12 shows an interfered signal detection probability according to a subcarrier detection range value.

Referring to FIG. 12, an interfered signal detection probability according to the subcarrier detection range value according to the exemplary embodiment of the present invention will be described.

FIG. 12 shows an interfered signal detection probability according to the subcarrier detection range value.

As shown in (a) of FIG. 12, an interfered signal 300 may cause direct to interference to a first subcarrier corresponding to a first frequency $f_{19}$ and a second subcarrier corresponding to a second $f_{20}$, and may cause interference by a side robe to a third subcarrier corresponding to a third frequency $f_{18}$ and a fourth subcarrier corresponding to a fourth frequency $f_{21}$.

In this case, the interfered signal 300 is as shown in (a) of FIG. 12.

The interfered signal detection probability may be shown as (b) of FIG. 12 according to a detection range value and a detection range.

According to the present invention, an interfered signal over a detection level can be accurately detected, and UWB communication can be performed without causing interference with a communication apparatus using another communication method by applying an avoid method such as a band avoid method or a tone-nulling method according to a level of the detected interfered signal.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A communication method for ultra-wide band (UWB) communication, comprising:
generating a digital detection signal including a plurality of time symbols by digital-converting a detection signal corresponding to a received signal;

estimating an average power value of the detection signal by calculating average power of the digital detection signal based on the digital detection signal; and when a predetermined reference power value is greater than the average power value, performing UWB communication through a predetermined first channel, wherein the first channel comprises a plurality of subcarriers; and when the average power value is greater than the reference power value, generating location information that corresponds to information on a subcarrier where an interfered signal exists by detecting a location of the interfered signal based on the digital detection signal; and performing UWB communication through a part of the plurality of subcarriers included in the first channel, excluding a subcarrier corresponding to the information, wherein the generating of the location information comprises:

Fourier-transforming N time symbols among a plurality of time symbols included in the digital detection signal to generate N frequency symbols respectively corresponding to the N time symbols;

generating a plurality of sample sums respectively corresponding to a plurality of subcarriers according to a predetermined detection bandwidth based on the N frequency symbols;

performing operation for adding an absolute value of a real number and an absolute value of an imaginary number of each sample sum based on the plurality of sample sums to generate a plurality of sample absolute values respectively corresponding to the plurality of sample sums;

generating a reference value for determining existence of the interfered signal based on the plurality of sample absolute values; and generating first location information corresponding to information on a subcarrier where the interfered signal exists among the plurality of subcarriers according to the detection bandwidth by comparing each of the plurality of sample absolute values with the reference value.

2. The communication method of claim 1, wherein each of the N frequency symbols comprises a plurality of frequency samples, and the generating of the plurality of sample sums comprises generating a plurality of sample sums respectively corresponding to the plurality of subcarriers according to the detection bandwidth by performing an operation for adding frequency samples corresponding to each of the plurality of subcarriers according to the detection bandwidth.

3. The communication method of claim 1, wherein the generating of the reference value comprises performing an operation for dividing a total of the plurality of sample absolute values by a predetermined subcarrier detection range value to generate the reference value.

4. The communication method of claim 1, wherein the generating of the first location information comprises comparing each of the plurality of sample absolute values respectively corresponding to the plurality of subcarriers according to the detection bandwidth with the reference value, determining the interfered signal exists in a subcarrier that corresponds to a sample absolute value that is greater than the reference value, and generating the first location information corresponding to information on the subcarrier where the interfered signal exists.

5. The communication method of claim 1, further comprising, before the generating of the digital detection signal, generating the detection signal by detecting a signal component corresponding to the first channel from the received signal.

6. The communication method of claim 5, further comprising, when the average power value is greater than the reference power value, changing the first channel to a second channel, wherein the generating of the detection signal comprises detecting a signal component corresponding to the second channel from the received signal to generate the detection signal.

7. The communication method of claim 5, wherein the generating of the detection signal comprises:

detecting a signal component corresponding to the first channel from the received signal for a predetermined time period; and generating the detection signal by amplifying the signal component with a predetermined gain.

8. A communication apparatus for performing ultra-wide-band (UWB) communication, comprising:

a module for detecting a signal component corresponding to a first channel for UWB communication from a signal received for a predetermined time period, and outputting a detection signal by amplifying the detected signal component;

a converter for digital-converting the detection signal and outputting a digital detection signal, wherein the digital detection signal comprises a plurality of time symbols;

a controller for estimating an average power value of the detection signal based on the digital detection signal, determining existence of an interfered signal from the first channel through the average power value, and applying a detection and avoid (DAA) method according to the determination result; and a communication unit for performing UWB communication according to control of the controller, wherein the controller comprises:

a data arranging unit for outputting a first group of time symbols from the plurality of time symbols in parallel; and a power calculation unit for calculating average power of the first group of time symbols based on the first group of time symbols and outputting the average power value.

9. The communication apparatus of claim 8, wherein the controller changes the first channel to a second channel when the interfered signal is detected from the first channel.

10. The communication apparatus of claim 8, wherein the controller generates information on a subcarrier where the interfered signal exists in a frequency domain when the interfered signal is detected from the first channel, and the communication unit performs UWB communication through the first channel by using a tone-nulling method corresponding to the information.

11. The communication apparatus of claim 10, wherein the controller comprises:

a location tracking unit for generating the information based on a plurality of frequency symbols that respectively correspond to the irst group of time symbols.

12. The communication apparatus of claim 11, wherein each of the plurality of frequency symbols comprises a plurality of frequency samples that respectively correspond to a plurality of subcarriers, and the location tracking unit comprises:

a plurality of Fourier transform units that respectively correspond to the first group of time symbols and are for outputting the plurality of frequency symbols by Fourier-transforming the first group of time symbols;

a first operation unit for outputting a plurality of sample sums respectively corresponding to the plurality of subcarriers by adding frequency samples that corresponds to each of the plurality of subcarriers based on the plurality of frequency symbols;

a second operation unit for outputting a plurality of sample absolute values respectively corresponding to the plurality of sample sums by adding an absolute value of a real number and an absolute value of an imaginary value of each sample sum based on the plurality of sample sums;

a third operation unit for outputting a reference value by dividing a total of the plurality of sample absolute values with a predetermined subcarrier detection range value based on the plurality of sample absolute values; and a location detection unit for generating the information by comparing each of the plurality of sample absolute values with the reference value.

13. A communication apparatus for performing ultra-wideband (UWB) communication, comprising:

a module for detecting a signal component corresponding to a first channel for UWB communication from a signal received for a predetermined time period, and outputting a detection signal by amplifying the detected signal component;

a converter for digital-converting the detection signal and outputting a digital detection signal, wherein the digital detection signal comprises a plurality of time symbols;

a controller for estimating an average power value of the detection signal based on the digital detection signal, determining existence of an interfered signal from the first channel through the average power value, and applying a detection and avoid (DAA) method according to the determination result; and a communication unit for performing UWB communication according to control of the controller, wherein the controller generates information on a subcarrier where the interfered signal exists in a frequency domain when the interfered signal is detected from the first channel, and the communication unit performs UWB communication through the first channel by using a tone-nulling method corresponding to the information, and wherein the controller comprises:
   a data arranging unit for outputting a first group of time symbols from the plurality of time symbols in parallel; and
   a location tracking unit for generating the information based on a plurality of frequency symbols that respectively correspond to the first group of time symbols.

14. The communication apparatus of claim 13, wherein each of the plurality of frequency symbols comprises a plurality of frequency samples that respectively correspond to a plurality of subcarriers, and the location tracking unit comprises:

a plurality of Fourier transform units that respectively correspond to the first group of time symbols and are for outputting the plurality of frequency symbols by Fourier-transforming the first group of time symbols;

a first operation unit for outputting a plurality of sample sums respectively corresponding to the plurality of subcarriers by adding frequency samples that corresponds to each of the plurality of subcarriers based on the plurality of frequency symbols;

a second operation unit for outputting a plurality of sample absolute values respectively corresponding to the plurality of sample sums by adding an absolute value of a real number and an absolute value of an imaginary value of each sample sum based on the plurality of sample sums;

a third operation unit for outputting a reference value by dividing a total of the plurality of sample absolute values with a predetermined subcarrier detection range value based on the plurality of sample absolute values; and a location detection unit for generating the information by comparing each of the plurality of sample absolute values with the reference value.

* * * * *